(12) United States Patent
Fan

(10) Patent No.: US 11,738,676 B2
(45) Date of Patent: Aug. 29, 2023

(54) TRAY BRACKET FOR CAR SEAT BACK

(71) Applicant: Eagle Fan, Hsinchu (TW)

(72) Inventor: Eagle Fan, Hsinchu (TW)

( * ) Notice: Subject to any disclaimer, the term of this patent is extended or adjusted under 35 U.S.C. 154(b) by 125 days.

(21) Appl. No.: 17/525,953

(22) Filed: Nov. 14, 2021

(65) Prior Publication Data
US 2023/0150412 A1    May 18, 2023

(51) Int. Cl.
*B60N 3/00* (2006.01)

(52) U.S. Cl.
CPC .................... *B60N 3/004* (2013.01)

(58) Field of Classification Search
CPC ....... B60N 3/004; B64D 11/0638; A47C 7/70; A47C 7/705
USPC ....... 108/28, 44, 152; 297/146, 135
See application file for complete search history.

(56) References Cited

U.S. PATENT DOCUMENTS

| | | | | |
|---|---|---|---|---|
| 2,503,602 A * | 4/1950 | Titley | .............. | B60N 2/345 248/210 |
| 2,720,436 A * | 10/1955 | Covey | .............. | B60N 3/004 108/135 |
| 4,466,659 A * | 8/1984 | Carpentier | .............. | A47C 7/70 224/318 |
| 5,046,433 A * | 9/1991 | Kramer | .............. | B60N 3/004 297/188.06 |
| 5,188,421 A * | 2/1993 | Arseneault | .............. | B60N 2/6036 297/188.2 |
| D344,625 S * | 3/1994 | Berry | .............. | D12/416 |
| 5,370,060 A * | 12/1994 | Wang | .............. | B60N 3/004 297/163 |
| 5,443,018 A * | 8/1995 | Cromwell | .............. | B60N 3/004 108/44 |
| 5,447,215 A * | 9/1995 | Volkmar | .............. | A45C 13/02 190/110 |
| 5,460,102 A * | 10/1995 | Pasmanick | .............. | A47B 23/002 108/43 |
| 5,642,674 A * | 7/1997 | Joye, Sr. | .............. | A47B 23/002 108/43 |
| 5,878,672 A * | 3/1999 | Ostermann | .............. | B60N 3/004 297/188.06 |
| 6,182,931 B1 * | 2/2001 | Richard | .............. | B60N 2/6009 248/102 |
| 6,494,533 B1 * | 12/2002 | Bohler | .............. | B60N 3/004 297/188.05 |
| 6,679,188 B1 * | 1/2004 | Spagnoli, Jr. | .............. | B60N 3/004 108/44 |

(Continued)

*Primary Examiner* — Jose V Chen
(74) *Attorney, Agent, or Firm* — LIN & ASSOCIATED INTELLECTUAL PROPERTY, INC.

(57) ABSTRACT

A tray bracket for car seat back is provided, including: a fixing unit, a hanging board, a tray, and a placement unit. The fixing unit is for fixing to at least one pillar on a car seat supporting a headrest; the hanging board has a back area and a front area with opposite positions. The back area is disposed with an array of positioning components with different heights. The fixing unit is engaged with one of the positioning components. The front area is distributed with several clips; the tray is pivotally connected to the bottom of the hanging board, the tray is tightly attached to the hanging board in the folded state, and can be horizontal and perpendicular to the hanging board when opened. The other side of the tray is provided with the placement unit, for placing a carton between the placement unit and the tray.

10 Claims, 12 Drawing Sheets

(56) References Cited

U.S. PATENT DOCUMENTS

| | | | |
|---|---|---|---|
| 6,763,986 B2* | 7/2004 | Santos | B60R 7/043 |
| | | | 224/586 |
| 6,848,746 B2* | 2/2005 | Gentry | A47C 7/748 |
| | | | 297/229 |
| 7,377,411 B1* | 5/2008 | Stewart | B60R 7/043 |
| | | | 224/585 |
| 7,658,153 B1* | 2/2010 | Patoka | B60R 11/00 |
| | | | 108/46 |
| 7,891,733 B1* | 2/2011 | Clarke | B60R 11/00 |
| | | | 211/85.3 |
| 9,403,464 B2* | 8/2016 | Valcic | B60R 7/043 |
| 2008/0238169 A1* | 10/2008 | Hicks | B60N 3/08 |
| | | | 297/353 |
| 2010/0275818 A1* | 11/2010 | Ellis | A47B 23/04 |
| | | | 108/147.11 |
| 2011/0155024 A1* | 6/2011 | McCaffrey | B60N 3/004 |
| | | | 108/26 |
| 2015/0115668 A1* | 4/2015 | Martinak | B60N 2/64 |
| | | | 297/163 |

* cited by examiner

TRAY BRACKET FOR CAR SEAT BACK

BACKGROUND OF THE INVENTION

1. Field of the Invention

The present invention relates generally to a tray bracket, and more particularly, to a tray bracket structure for installing at the pillars of the headrest of a car seat and can be stowed or unfolded for use.

2. The Prior Arts

Automobiles are a common transportation means for general public. Portable electronic products, such as, smart phones, tablet computers, etc., are tools for communication or entertainment for most people. While it is extremely dangerous for drivers to use portable electronic products, it is perfectly alright for the passengers to use portable electronic products in the car to avoid boredom in the car.

To provide a more comfortable riding space, some manufacturers have provided bracket assemblies for the car seat back for passengers in the rear seat. Some brackets are specially used to fix portable electronic products for passengers to watch movies, and some brackets provide collapsible dinner plates or cup holders to allow the passengers to temporarily place food or beverage bottles for eating and drinking. For this reason, the inventor aims at designing a multi-purpose bracket structure to meet the various needs of back-seat passengers and bring great convenience during the ride.

SUMMARY OF THE INVENTION

A primary objective of the present invention is to provide a multi-purpose tray bracket for car seat back, the structure can be easily fixed to a number of pillars, which are located in the car seat to support the headrest. After the structure is unfolded, a tray for storage can be provided, allowing passengers to obtain a temporary desktop in the back seat for placing food, beverage cups, laptops, etc.; in addition, various portable electronic products, such as smart phones, tablet PCs can also be clamped and fixed to allow back-seat passengers to watch videos more comfortably. In addition, a carton can also be fixed here for convenient use by back-seat passengers.

To achieve the above-mentioned objective, the present invention is to provide a tray bracket for car seat back, including a fixing unit, a hanging board, a tray, and a placement unit; wherein the fixing unit is used to fix to the pillars of a car seat for supporting a headrest; the hanging board has a back area and a front area on opposite sides, the back area is disposed with an array of positioning components of different heights, the fixing unit is engaged with one of the positioning components, the front area is disposed with a plurality of clips; the tray is pivotally connected to the bottom of the hanging board, the tray is close to the hanging board in the folded state, and can be in a horizontal position and perpendicular to the hanging board when opened; the placement unit is disposed on the tray at the side facing away from the hanging board, and the placement unit is for accommodating a carton between the placement unit and the tray.

In a preferred embodiment, the fixing unit is a strap provided with an adjusting fastener to control the length after tightening, and the strap can wrap around the periphery of the pillar to achieve tightening and fixing.

In a preferred embodiment, the positioning component includes a bridge and a channel, a plurality of the bridges are distributed at different positions in the back area, and can be grouped according to different heights; each bridge forms a channel for the strap to pass through, so that the partial section of the fixing unit is restricted to the positioning component.

In a preferred embodiment, a plurality of the clips are arranged side by side at intervals, a portable electronic product can be clamped by at least one of the clips, and the portable electronic product in the clamped state is attached to the surface of the front area.

In a preferred embodiment, a cup holder is pivotally connected to the hanging board and located in the front area, the cup holder has at least one frame, and the cup holder can be turned upright and attached to the hanging board when not in use; after opening, the cup holder is in a horizontal position and perpendicular to the hanging board.

In a preferred embodiment, the placement unit includes at least one elastic band and a cover plate, the cover plate is connected to the tray via the elastic band, the distance between the cover plate and the tray is adjustable, and an opening is disposed at the center of the cover plate.

In a preferred embodiment, the placement unit includes at least one elastic band and a cloth bag, the cloth bag is connected to the tray via the elastic band, the cloth bag has an opening in the center, and the carton is wrapped in the cloth bag and fixed onto the tray.

In a preferred embodiment, the placement unit includes at least one elastic band and a mesh bag, the mesh bag is elastic and expandable in size by stretching, the mesh bag is connected to the tray via the elastic band, and the carton is placed in the mesh bag.

In a preferred embodiment, an outer wall of the tray forms at least a docking seat, and the docking seat can be used for installing other accessories.

In a preferred embodiment, the hanging board forms at least one hook on a vertical side wall.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
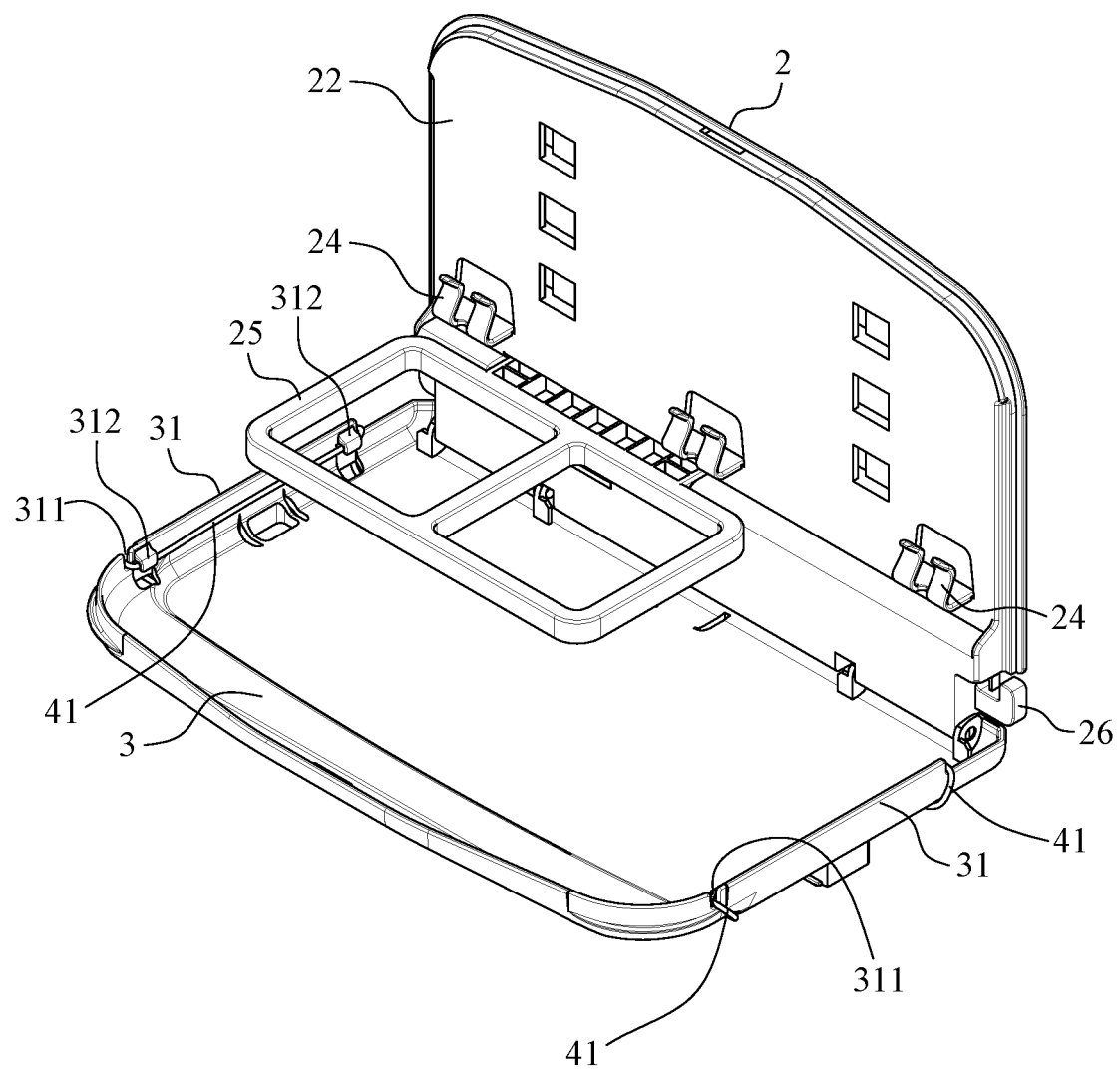
FIG. 1 is a perspective view of the tray bracket of the first embodiment of the present invention.
Figure 2:
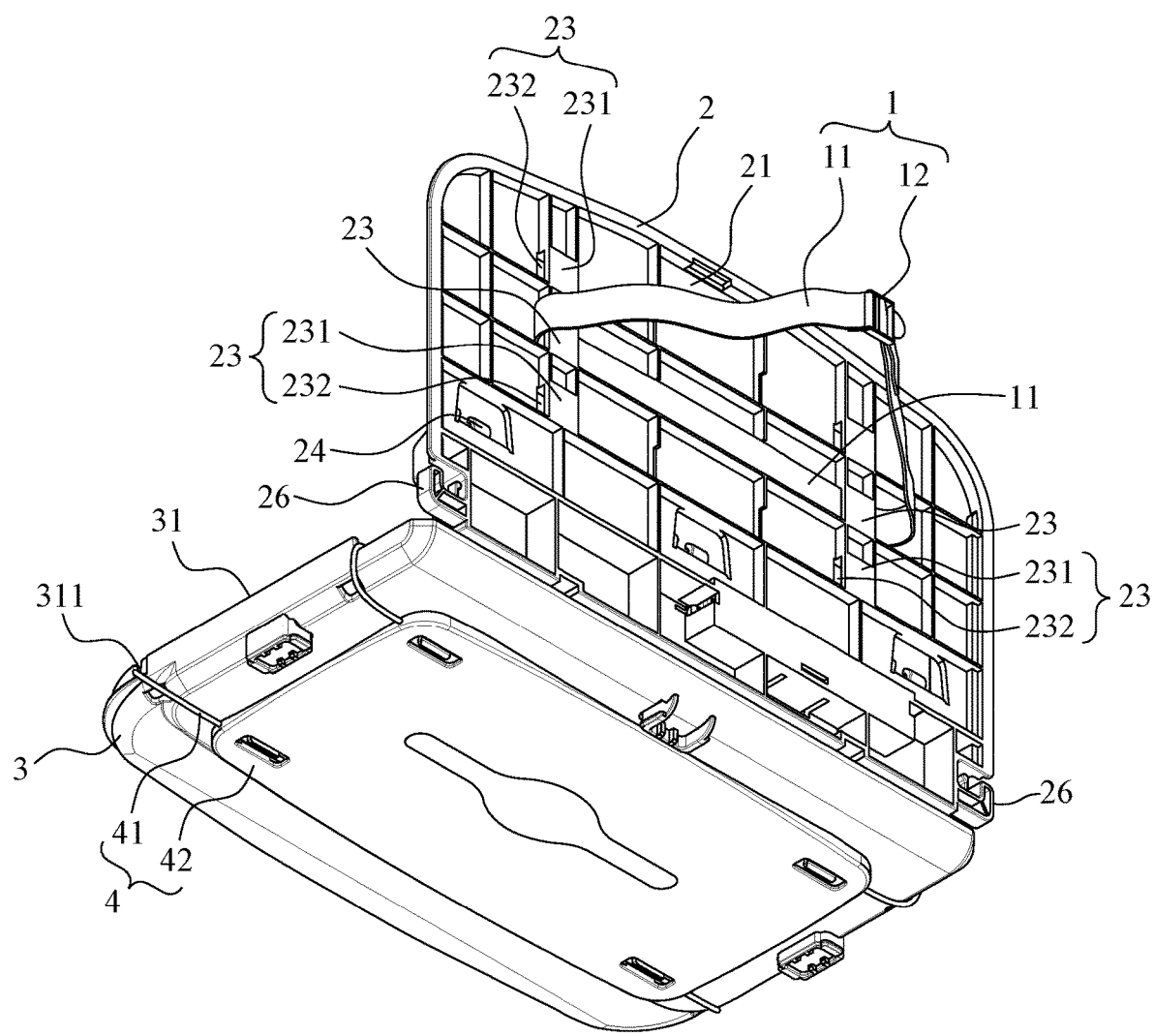
FIG. 2 is a perspective view of the tray bracket of the first embodiment of the present invention from an upward perspective.

As shown in FIG. 1 and FIG. 2, respectively are three-dimensional views of different angles of the tray bracket for car seat back of the present invention. The tray bracket includes a fixing unit 1, a hanging board 2, a tray 3, and a placement unit 4. The fixing unit 1 is used for fixing to a plurality of pillars. The hanging board 2 has a back area 21 and a front area 22 on opposite sides. The back area 21 is disposed with an array of positioning components 23 of different heights. The fixing unit 1 is engaged with at least one set of the positioning components 23. The front area 22 is disposed with a plurality of clips 24 arranged in a distributed manner; the tray 3 is pivotally connected to the bottom of the hanging board 2, the tray 3 can be folded to stay close to the hanging board 2 in the folded state; when opened, the tray 3 is in a horizontal position and perpendicular to the hanging board 2; the placement unit 4 is disposed on the tray 3 at the side facing away from the hanging board 2, and the placement unit 4 can accommodate a carton between the placement unit 4 and the tray 3. As such, the tray 3 can be folded when not in use to save space. After unfolded, the tray 3 can stay horizontal for placing food, beverage cups, notebook computers, etc., or the portable electronic products can be fixed onto the hanging board 2 to improve the convenience of watching movies. The placement unit 4 can also fix a removable carton, such as a box of tissue papers, so that the tray holder is convenient to use, as well as provides good practicability and flexibility in a variety of usage scenarios.

Figure 6:
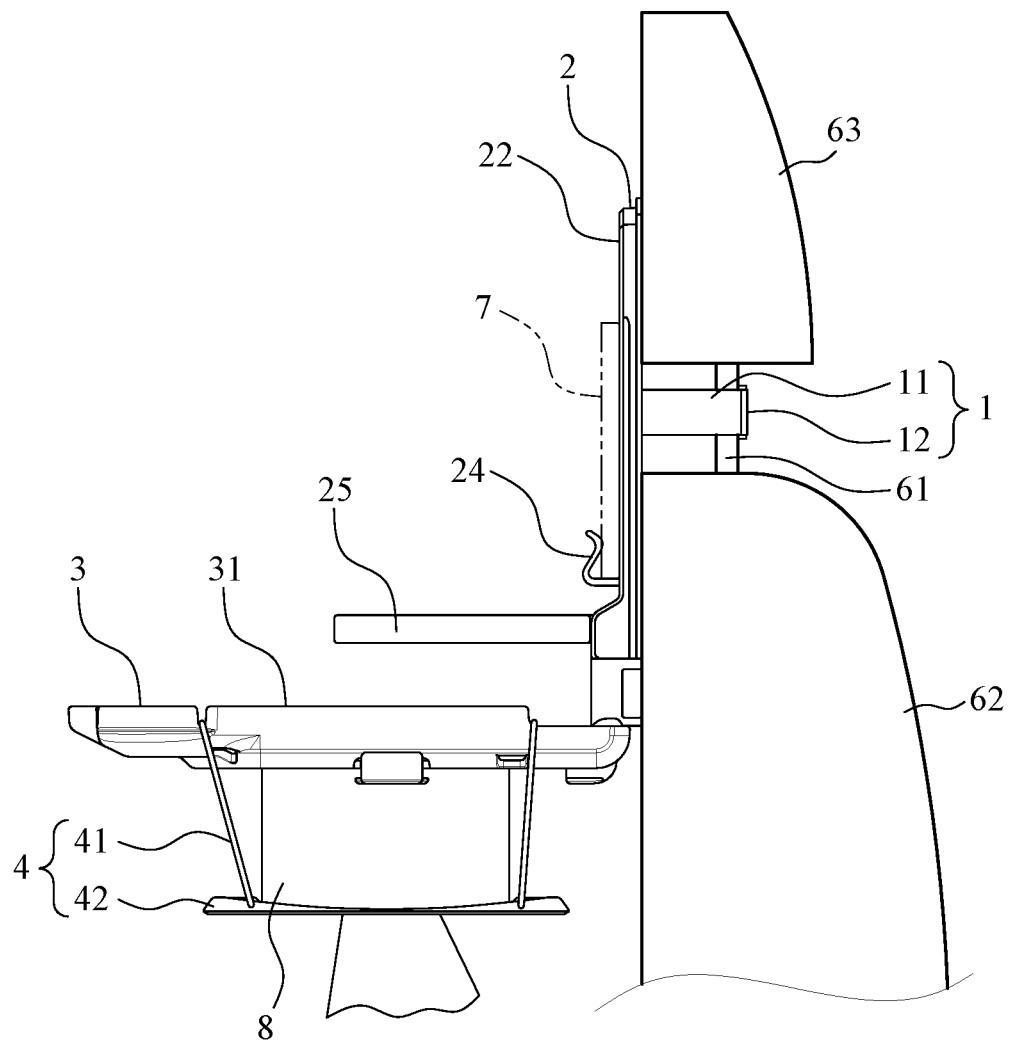
FIG. 6 is a first side view of the tray bracket of the first embodiment of the present invention in use state.

The following describes the structure of each component:

As shown in FIGS. 1, 2 and 6, the fixing unit 1 is used to fix to a pillar 61. The pillar 61 is located on the seat 62 in a car and supports a headrest 63. Depending on the car, the number of pillars 61 one or plural. In the present embodiment, the fixing unit 1 is a strap 11, and the strap 11 is provided with an adjusting fastener 12. The adjusting fastener 12 controls the tightening length of the strap 11, so that the fixing unit 1 can be wound and fixed to the pillar 61. In addition, the fixing unit 1 may also be an elastic band or a buckle, as long as the function of fixing the pillar 61 can be achieved.

The hanging board 2 is a plate, which is fixed in an upright position when in use. The hanging board 2 has the back area 21 and the front area 22 on opposite sides. The back area 21 is disposed with an array of positioning components 23 of different heights, and the positioning components 23 are used for passing the strap 11 of the fixing unit 1 to adjust the height of the hanging board 2 being fixed. Each positioning component 23 includes a bridge 231 and a channel 232. The channel 232 is formed under the bridge 231. A plurality of bridges 231 are distributed at different positions of the back area 21 and are grouped according to different heights. In addition, the channel 232 of the same height can allow the strap 11 to pass through, so that a partial section of the strap 11 is restricted to the positioning components 23, so that the fixing unit 1 is engaged with the hanging board 2.

The hanging board 2 has a plurality of protruding clips 24 distributed in the front area 22. The clip 24 is partially connected to the hanging board 2 with elasticity, and the opening of the clip 24 faces upwards for the portable electronic product 7 to be inserted into the clip 24 from the top, so that the portable electronic product 7 can be close to the surface of the front area 22. The portable electronic product 7 can be a mobile phone, a tablet computer or other audio-visual playback devices. In the present embodiment, a plurality of the clips 24 are arranged side by side in the front plate area 22 at equal intervals. When a tablet computer is to be fixed, two or three clips 24 can be used for clamping. In addition, one clip 24 can be used to hold the mobile phone in a straight manner, and two clips 24 can be used to hold the mobile phone in a horizontal manner to facilitate the user to watch the video.

Figure 3:
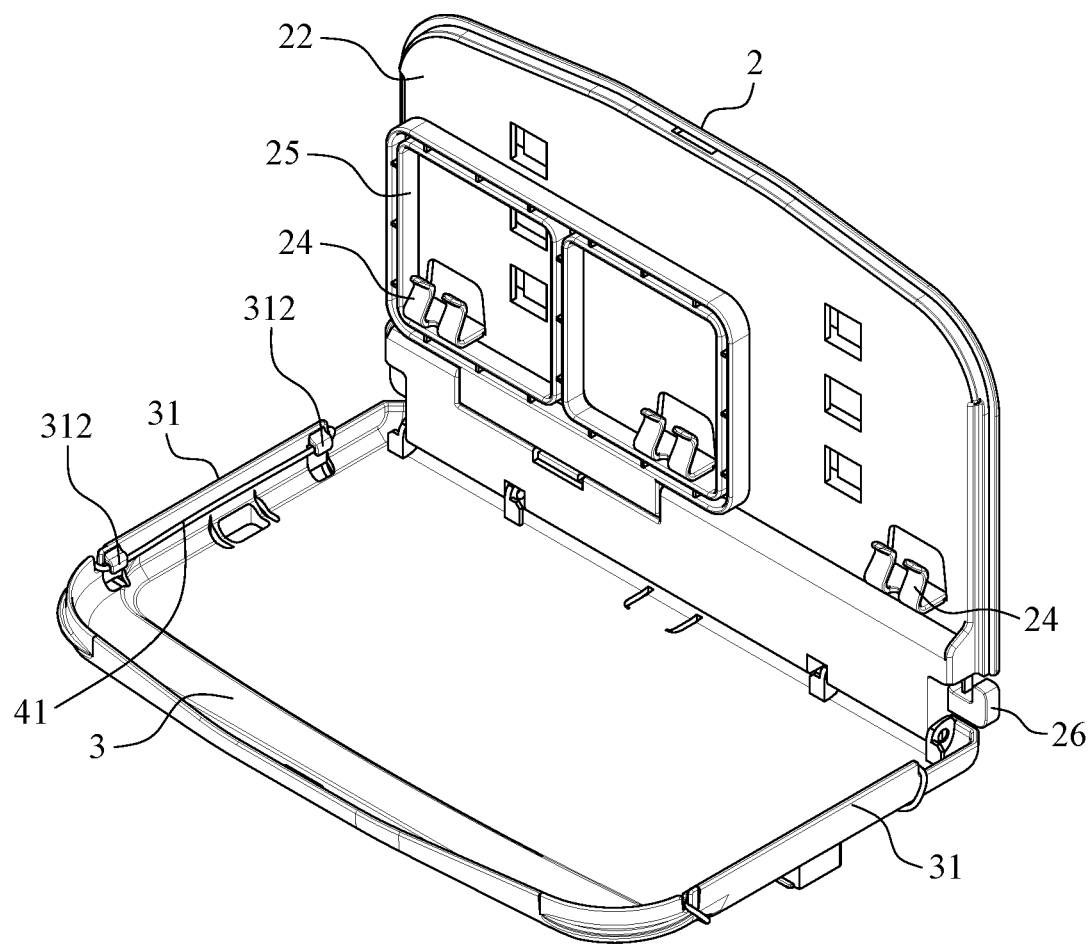
FIG. 3 is a perspective view of the cup holder of the tray bracket of the first embodiment of the present invention in the folded state.

In addition, the hanging board 2 is also provided with a cup holder 25 in the front area 22. In the present embodiment, the cup holder 25 is a frame with two quadrilaterals, but it is not limited to this. The frame can also be round frame or C-shape, so as to hold cups or canned drinks conveniently. The cup holder 25 is pivotally connected to the hanging board 2 and is located in the front area 22. As shown in FIG. 1, the cup holder 25 is in a horizontal position and perpendicular to the hanging board 2 when in use. As shown in FIG. 3, when not in use, the cup holder 25 can be flipped upward to attach to the hanging board 2 to save space.

In addition, the hanging board 2 has a hook 26 on each of the vertical walls on both sides. The hook 26 can be used for hanging a bag as a temporary hanging place for objects.

Figure 4:
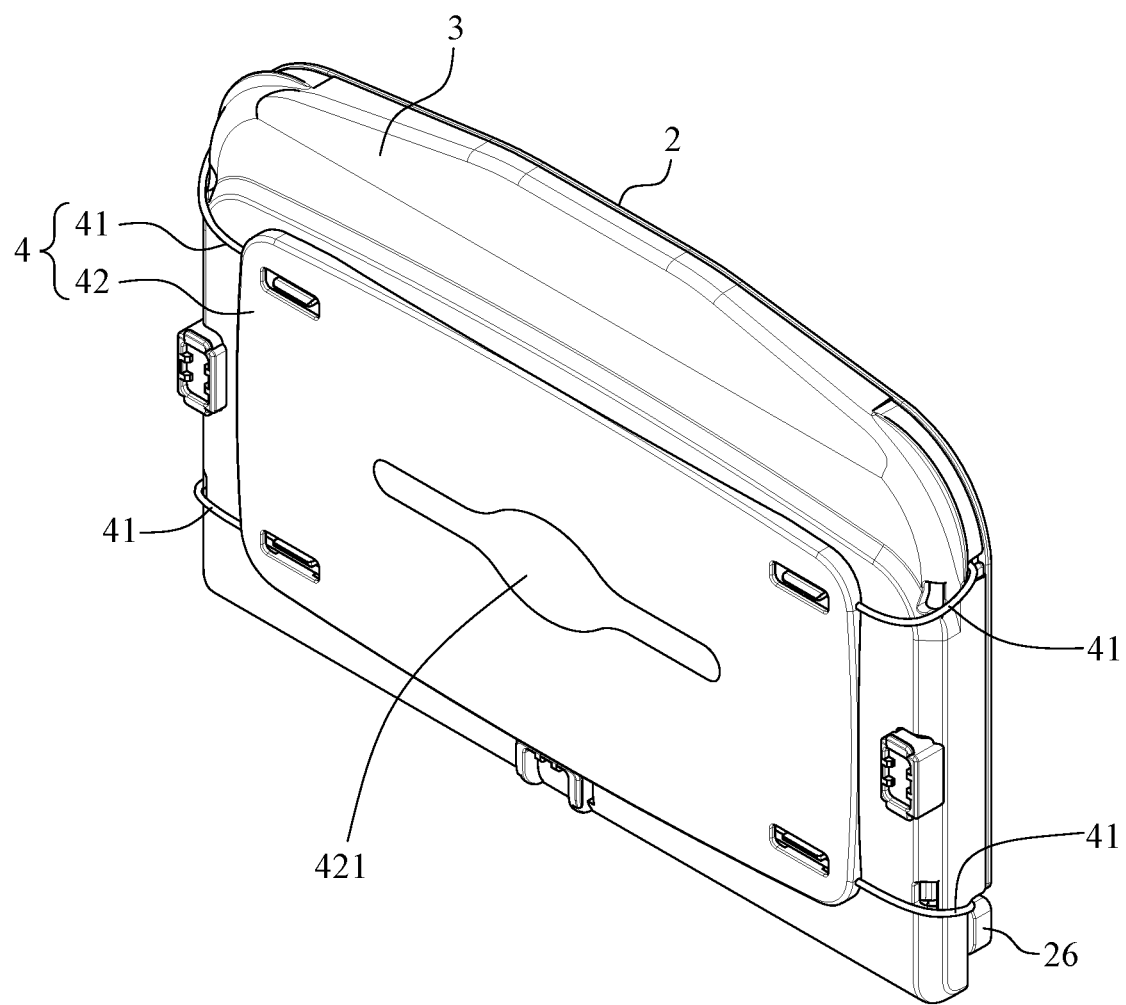
FIG. 4 is a perspective view of the tray of the tray bracket of the first embodiment of the present invention in the folded state.

The tray 3 is pivotally connected to the bottom side of the hanging board 2, and can be placed in a horizontal position and becomes perpendicular to the hanging board 2 after opened. As shown in FIG. 4, the tray 3 is in an upright position and attached to the hanging board 2 when in a folded state. As shown in FIG. 1, the tray 3 has a surrounding wall 31 on both sides, which is higher than the middle area, so that food or beverage cans, laptops or other items can be placed in the middle area of the tray 3 and not easy to fall out. The surrounding wall 31 additionally has at least one notch 311 and at least one clamping member 312. The clamping member 312 is located inside the surrounding wall 31 and protrudes toward the center of the tray 3. This structure is for installing and fixing the placement unit 4.

The placement unit 4 is disposed on the side of the tray 3 facing away from the hanging board 2, and the placement unit 4 is used to accommodate a carton between the placement unit 4 and the tray 3. The placement unit 4 can be in a variety of different embodiments, and the following will illustrate a few exemplars.

Figure 5:
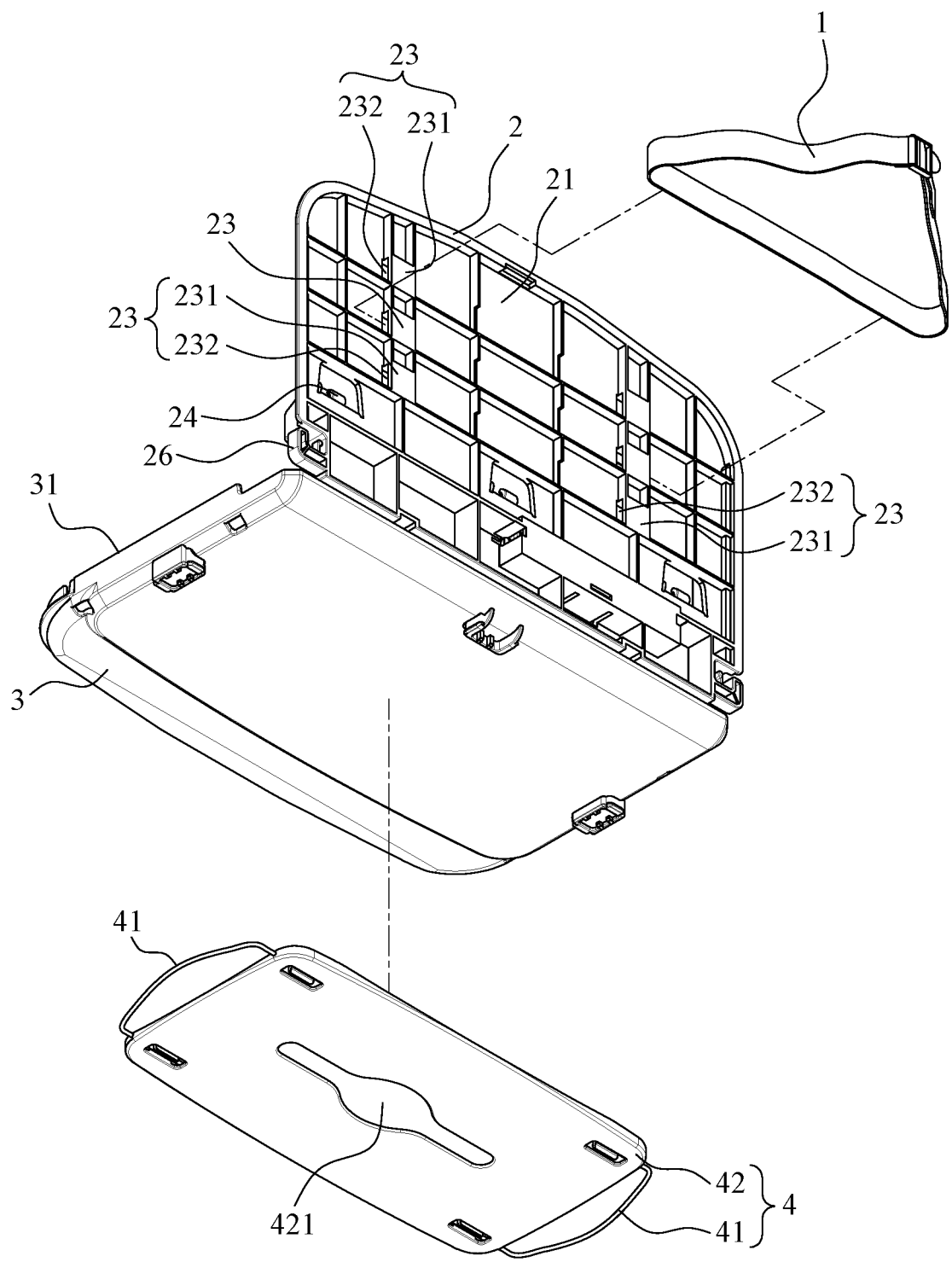
FIG. 5 is an exploded view of the tray bracket of the first embodiment of the present invention.

As shown in FIG. 5, the placement unit 4 includes at least one elastic band 41 and a cover plate 42. In the present embodiment, the elastic band 41 is partially connected around the cover plate 42, and another section is connected to the tray 3. The cover plate 42 has an opening 421 at the center. When the carton, such as, tissue box, is fixed between the cover plate 42 and the tray 3, the opening 421 serves as a paper extraction opening. In the present embodiment, the elastic band 41 is ring-shaped, and a partial section is fixed to the cover plate 42, so that the elastic band 41 forms a lug strap located on both sides of the cover plate 42. As shown in FIG. 1, the elastic band 41 passes through the notch 311, and a plurality of the clamping members 312 are hooked on a partial section of the elastic band 41, so as to achieve the purpose of engaging the placement unit 4 with the tray 3. If not in use, the elasticity of the elastic band 41 can be used to make the cover 42 close to the tray 3. When a carton is to be placed, the stretch capability of the elastic band 41 can be used to adjust the distance between the cover 42 and the tray 3. For different sizes and types of cartons, such as tissue paper boxes, sanitary paper boxes, and wet tissue boxes can all be placed here.

Figure 7:
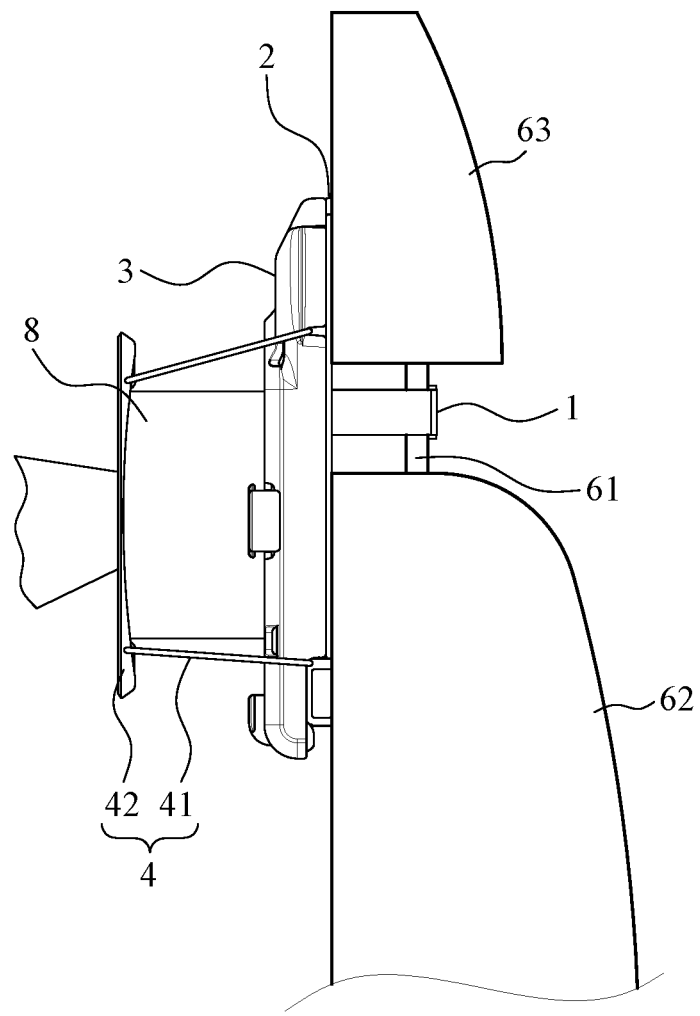
FIG. 7 is a second side view of the tray bracket of the first embodiment of the present invention in use state.

FIG. 6 and FIG. 7 show the actual use of the tray bracket for car seat back according to the present invention. The tray bracket is installed behind the car seat 62, and the headrest 63 is fixed on the seat 62 by at least one pillar 61. The fixing unit 1 first uses the strap 11 to install at the corresponding height positioning components 23 of the hanging board 2, and then the strap 11 is wrapped around the periphery of the pillar 61 to fix the hanging board 2 to the seat 62 and behind the headrest 63. As shown in FIG. 6, the tray 3 is pulled down to a horizontal position, and the cup holder 25 is also flipped down and becomes horizontal, so that the tray 3 can be used to receive the items to be placed on. The cup holder 25 can be used for placing beverage cups or beverage cans. A portable electronic product 7, such as a tablet computer or a mobile phone, can be clamped at the bottom edge by the clip 24, so that the portable electronic product 7 can be attached to the front area 22 for users to watch videos or use a mobile phone. A removable carton 8 can use the placement unit 4 to fix to the bottom surface of the tray 3, and use the stretch capability of the elastic band 41 to expand to accommodate the carton 8 with different thicknesses. As shown in FIG. 7, the tray 3 is folded and attached to the hanging board 2. As seen, no matter whether the tray 3 is in an upright or horizontal position, the user can easily extract the contents of the carton 8 for use.

Figure 8:
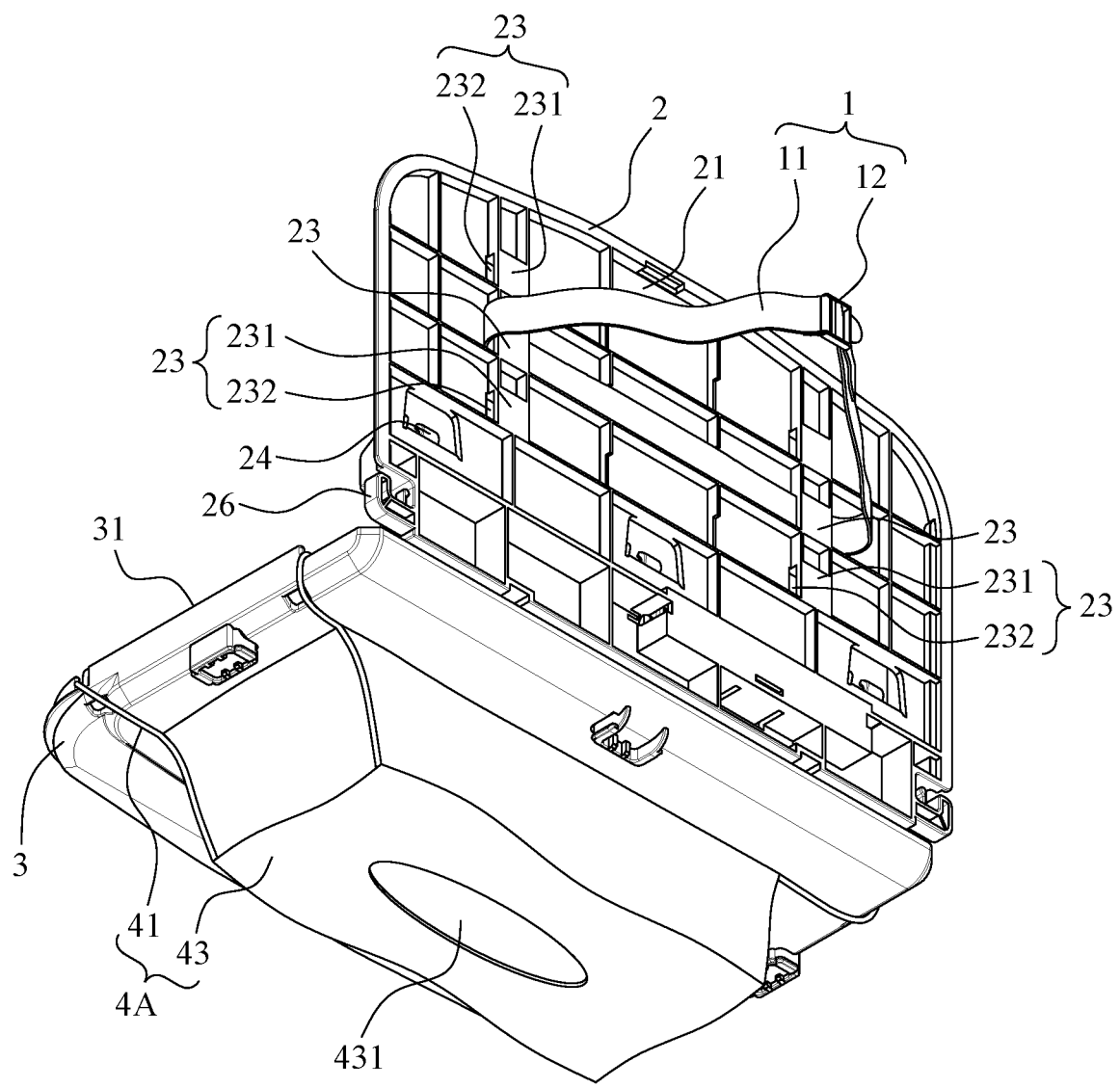
FIG. 8 is a perspective view of the tray bracket of the second embodiment of the present invention.
Figure 9:
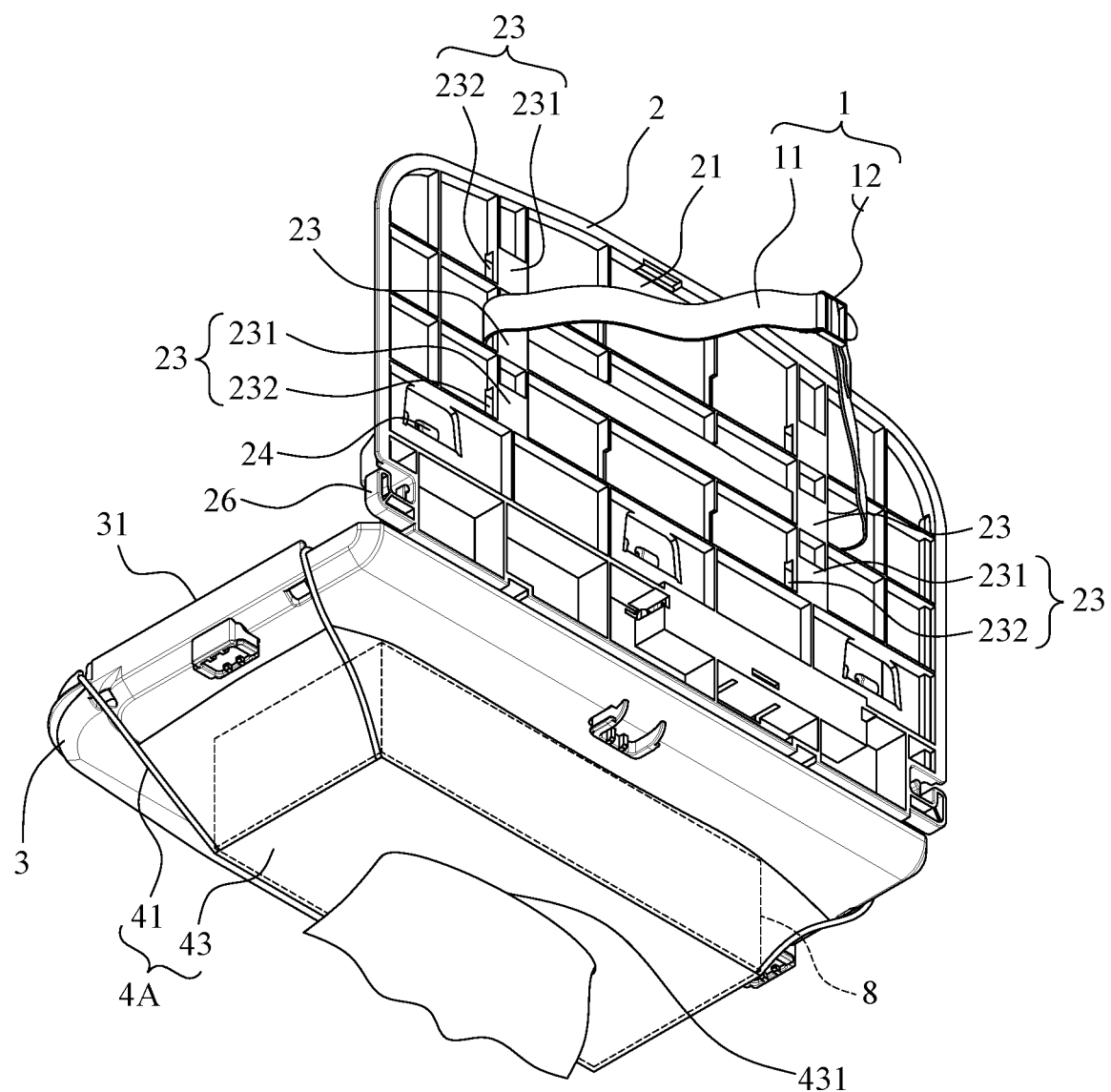
FIG. 9 is a schematic view of the tray bracket of the second embodiment of the present invention in use state.

FIG. 8 is a schematic view of the second embodiment of the present invention. In the present embodiment, another type of placement unit 4A is used. The placement unit 4A includes at least one elastic band 41 and a cloth bag 43. The cloth bag 43 is combined with the elastic band 41. The elastic band 41 is located on both sides of the cloth bag 43 in the shape of a lug strap. The cloth bag 43 can be elastic. For stretchable cloth or bags, the present embodiment also uses the elastic band 41 to be fixed to the surrounding wall 31 on both sides of the tray 3. The cloth bag 43 has an opening 431 in the center, as shown in FIG. 9, so that the carton 8 can be wrapped by the cloth bag 43 and fixed to the bottom of the tray 3 when in use.

Figure 10:
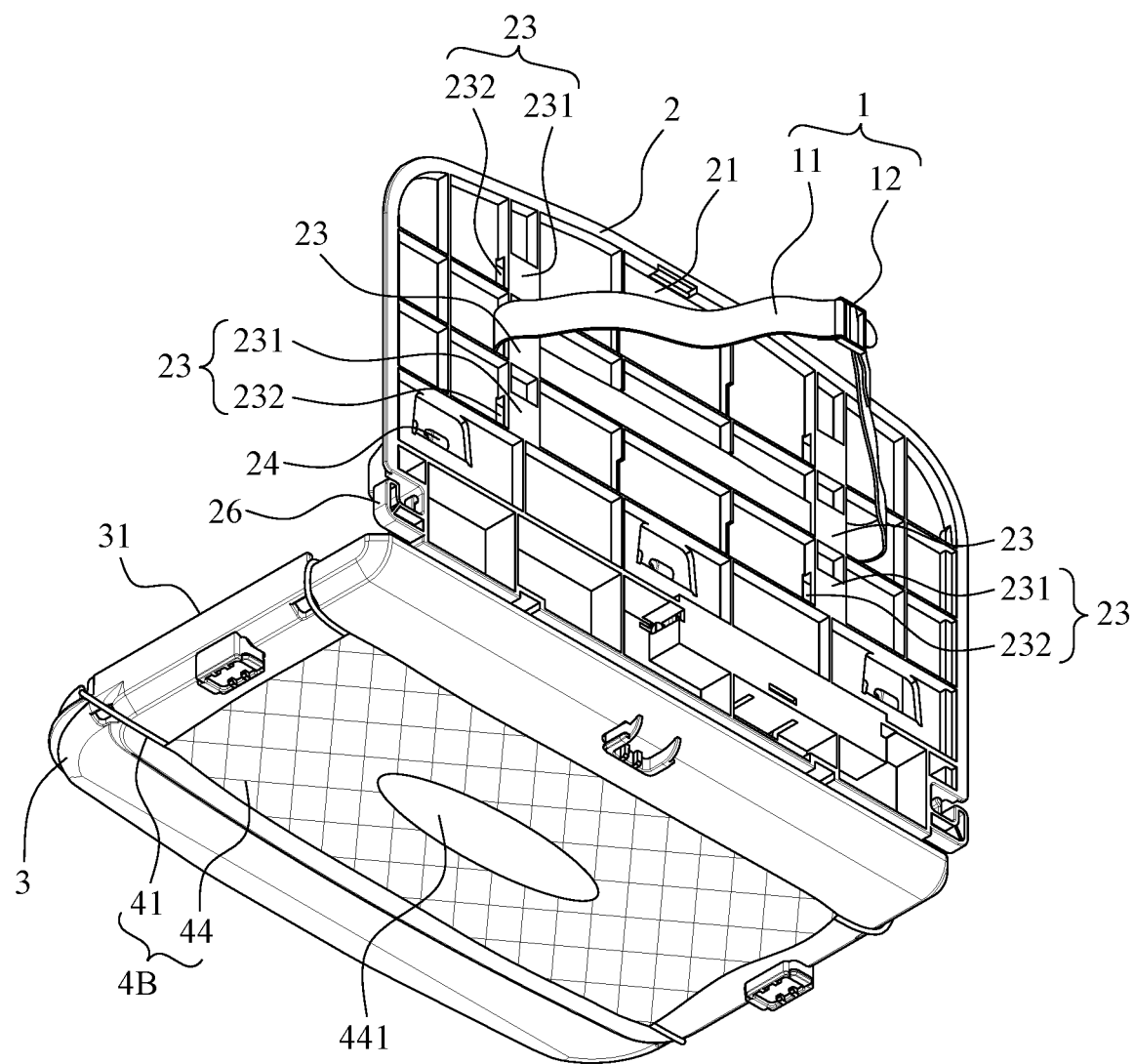
FIG. 10 is a perspective view of the tray bracket of the third embodiment of the present invention.
Figure 11:
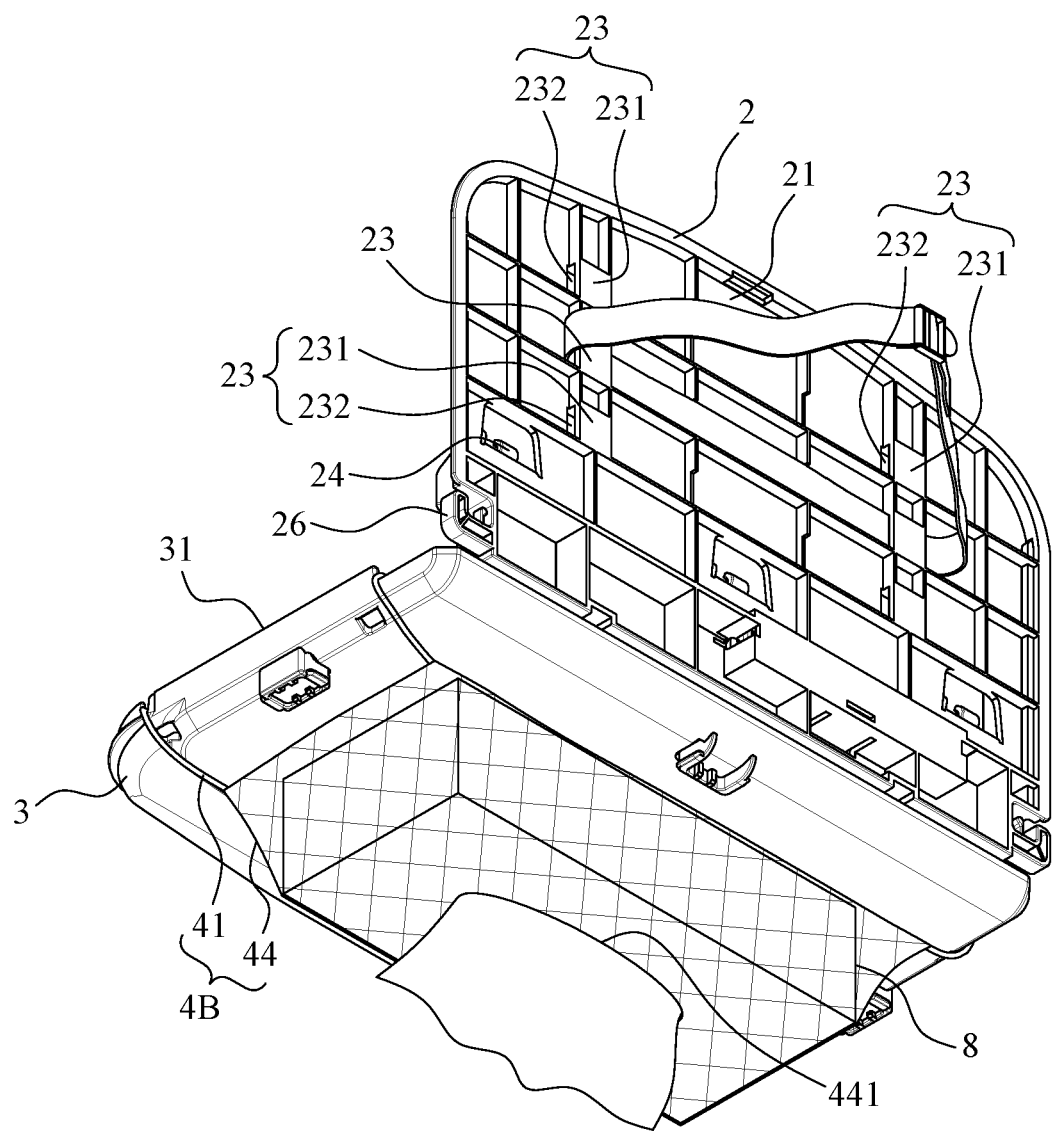
FIG. 11 is a schematic view of the tray bracket of the third embodiment of the present invention in use state.

FIG. 10 is a schematic view of the third embodiment of the present invention. In the present embodiment, another type of placement unit 4B is used. The placement unit 4B includes at least one elastic band 41 and a stretchable and elastic mesh bag 44. The elastic band 41 is located on both sides of the mesh bag 44 in the shape of a lug strap. The mesh bag 44 is an elastic and stretchable net. The elastic band 41 is used to fix to the surrounding wall 31 on both sides of the tray 3. The mesh bag 44 has an opening 441 in the center, as shown in FIG. 11, so that the carton 8 can be wrapped by the cloth bag 43 and fixed to the bottom of the tray 3 when in use.

In summary, the placement unit 4 of the present invention is not limited to a single embodiment, as long as the structure that can fix the carton to one side of the tray 3 can be used as the placement unit of the present invention.

Figure 12:
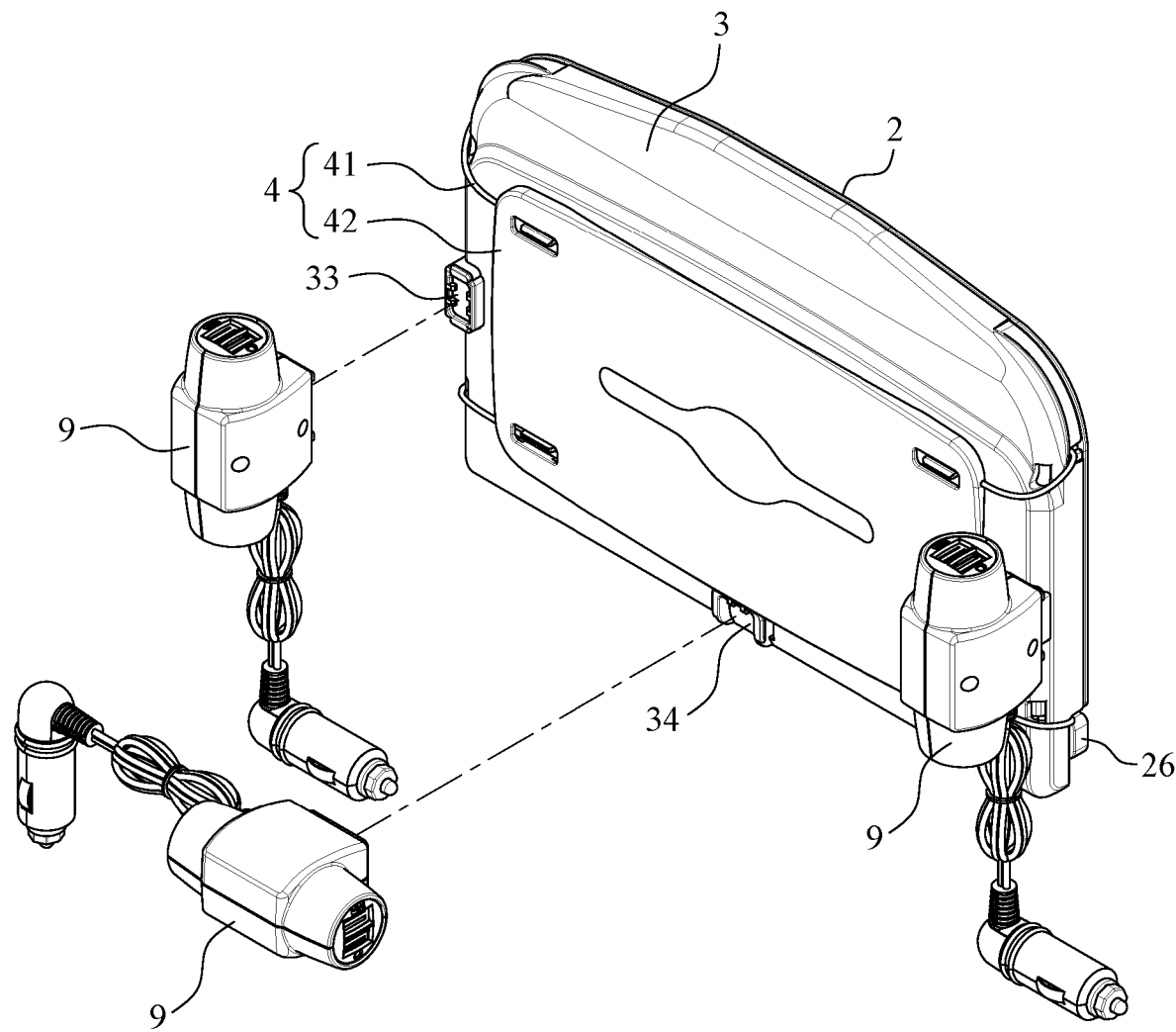
FIG. 12 is a schematic view of other accessories used in the tray holder of the present invention.

As shown in FIG. 12, the outer wall of the tray 3 can form at least one docking seat 33, 34, and the structure of the docking seat 33, 34 can have a matching shape according to the structure of an accessory 9. In the present embodiment, the accessory 9 is a socket set that can be used as an extension of the power supply. The accessory 9 is installed here to provide power for the portable electronic product 7. Although three sets are drawn in the figure, only one set of accessories is actually used when in use. A plurality of different docking seats 33, 34 are convenient for users to install in the most favorable position. In addition, the types of accessories 9 are not limited to the present embodiment, and other accessories to be installed on the tray 3 can be selected according to the needs of the user.

In summary, the present invention provides a tray bracket for car seat back. The structure can be easily fixed to the pillar 61 on the seat 62 in a car. After the tray 3 is unfolded and laid flat, the passengers in the back seat can get a temporary flexible desktop for placing food, beverage cups, notebook computers, and so on. In addition, various portable electronic products, such as smart phones and tablet computers, can be clamped and fixed on the hanging board 2, which is convenient for back-seat passengers to watch videos. Moreover, the removable carton can be accommodated by the placement unit 4, which is convenient for back-seat passengers. The overall structure is practical and creative, and meets the patent application requirements.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A tray bracket for car seat back, comprising:
   a fixing unit, for fixing to at least a pillar of a car seat, the pillar being for supporting a headrest;
   a hanging board, having a back area and a front area on opposite sides, the back area being disposed with an array of positioning components of different heights, the fixing unit being engaged with one of the positioning components for fixing the hanging board to the pillar, the front area being disposed with a plurality of clips;
   a tray, pivotally connected to the bottom of the hanging board, the tray being close to the hanging board in a folded state, and being in a horizontal position and perpendicular to the hanging board when opened; and
   a placement unit, disposed on the tray at a side facing away from the hanging board, and an accommodating space being formed between the placement unit and the tray.

2. The tray bracket for car seat back according to claim 1, wherein the fixing unit is a strap provided with an adjusting fastener to control the length of the strap after tightening, and the strap can wrap around the pillar to achieve tightening and fixing.

3. The tray bracket for car seat back according to claim 2, wherein the positioning component comprises a bridge and a channel, a plurality of the bridges are distributed at different positions in the back area, and can be grouped according to different heights; each bridge forms a channel for the strap to pass through, so that the partial section of the fixing unit is restricted to the positioning component.

4. The tray bracket for car seat back according to claim 1, wherein a plurality of the clips are arranged side by side at intervals, a portable electronic product can be clamped by at least one of the clips, and the portable electronic product in the clamped state is attached to the surface of the front area.

5. The tray bracket for car seat back according to claim 1, wherein a cup holder is pivotally connected to the hanging board and located in the front area, the cup holder has at least one frame, and the cup holder can be turned upright and attached to the hanging board when not in use; after opening, the cup holder is in a horizontal position and perpendicular to the hanging board.

6. The tray bracket for car seat back according to claim 1, wherein the placement unit comprises at least one elastic band and a cover plate, the cover plate is connected to the tray via the elastic band, the distance between the cover plate and the tray is adjustable, and an opening is disposed at the center of the cover plate.

7. The tray bracket for car seat back according to claim 1, wherein the placement unit comprises at least one elastic band and a cloth bag disposed in the accommodating space, the cloth bag is connected to the tray via the elastic band, and the cloth bag has a center opening.

8. The tray bracket for car seat back according to claim 1, wherein the placement unit comprises at least one elastic band and a mesh bag disposed in the accommodating space, the mesh bag is elastic and expandable in size by stretching, and the mesh bag is connected to the tray via the elastic band.

9. The tray bracket for car seat back according to claim 1, wherein an outer wall of the tray forms at least a docking seat, and the docking seat can be used for installing other accessories.

10. The tray bracket for car seat back according to claim 1, wherein the hanging board forms at least one hook on a vertical side wall.

\* \* \* \* \*